United States Patent
Martin Da Silva et al.

(10) Patent No.: US 9,018,780 B2
(45) Date of Patent: Apr. 28, 2015

(54) CONTROL SYSTEM AND METHOD TO IMPROVE THE ELECTRICAL ENERGY PRODUCTION OF A VARIABLE SPEED WIND TURBINE BY ALTERNATIVE REGULATION

(75) Inventors: Angel Martin Da Silva, Madrid (ES); Juan Carlos Garcia Andujar, Madrid (ES); Jose Ma Lopez Rubio, Madrid (ES); Mario Jimenez De Lago, Madrid (ES); Ignacio Romero Sanz, Madrid (ES)

(73) Assignee: Gamesa Innovation & Technology, S.L., Sarriguren (ES)

(*) Notice: Subject to any disclaimer, the term of this patent is extended or adjusted under 35 U.S.C. 154(b) by 0 days.

(21) Appl. No.: 12/964,757

(22) Filed: Dec. 10, 2010

(65) Prior Publication Data

US 2011/0215577 A1 Sep. 8, 2011

(30) Foreign Application Priority Data

Dec. 16, 2009 (ES) .................................. 200902345

(51) Int. Cl.
  *H02P 9/04*  (2006.01)
  *F03D 7/02*  (2006.01)
  *F03D 7/04*  (2006.01)

(52) U.S. Cl.
  CPC ............... *F03D 7/028* (2013.01); *F03D 7/043* (2013.01); *F05B 2270/1016* (2013.01); *F05B 2270/1033* (2013.01); *F05B 2270/20* (2013.01); *Y02E 10/723* (2013.01)

(58) Field of Classification Search
  CPC . F03D 7/028; F03D 7/043; F05B 2270/1016; F05B 2270/1033; F05B 2270/20; Y02E 10/723
  USPC ....................................................... 290/44, 55
  See application file for complete search history.

(56) References Cited

U.S. PATENT DOCUMENTS 4,161,658 A * 7/1979 Patrick ............................ 290/44
4,703,189 A * 10/1987 DiValentin et al. ............. 290/44

(Continued)

FOREIGN PATENT DOCUMENTS

EP  1990539 A1 * 11/2008
ES  2353089 A1 *  2/2011

(Continued)

*Primary Examiner* — Tulsidas C Patel
*Assistant Examiner* — S. Mikailoff
(74) *Attorney, Agent, or Firm* — Ladas & Parry LLP

(57) ABSTRACT

A control system to improve the production of a variable speed wind turbine comprising control devices for a standard regulation tracking a power vs. generator speed curve that also uses an alternative regulation for optimizing the energy production along determinate time periods $T_b$ for compensating previous energy losses at a higher power $P_b$ than the power determined by the standard regulation, the alternative regulation being based on a continuous calculation of the accumulated lost energy ALE as the energy lost with respect to the maximum allowed energy production according to the standard regulation and the fixation of the higher power $P_b$ and a setting of the duration of the time periods $T_b$ being compatible with wind turbine electrical or mechanical limitations. A wind turbine controlled by the method.

17 Claims, 4 Drawing Sheets

(56) References Cited

U.S. PATENT DOCUMENTS

| | | | |
|---|---|---|---|
| 5,225,712 A * | 7/1993 | Erdman | 290/44 |
| 2001/0043013 A1* | 11/2001 | Abe | 307/66 |
| 2005/0062290 A1* | 3/2005 | Stahlkopf | 290/44 |
| 2006/0273595 A1* | 12/2006 | Avagliano et al. | 290/44 |
| 2009/0027002 A1* | 1/2009 | Stahlkopf | 320/101 |
| 2009/0066089 A1* | 3/2009 | Arinaga et al. | 290/55 |
| 2010/0241280 A1* | 9/2010 | Garcia Barace et al. | 700/287 |
| 2012/0299298 A1* | 11/2012 | Romero Sanz et al. | 290/44 |
| 2014/0152105 A1* | 6/2014 | Yasugi et al. | 307/52 |

FOREIGN PATENT DOCUMENTS

| | | |
|---|---|---|
| WO | 2008/046942 A1 | 4/2008 |
| WO | WO 2008046942 A1 * | 4/2008 |
| WO | WO 2011048251 A1 * | 4/2011 |

\* cited by examiner

- Prior Art -

CONTROL SYSTEM AND METHOD TO IMPROVE THE ELECTRICAL ENERGY PRODUCTION OF A VARIABLE SPEED WIND TURBINE BY ALTERNATIVE REGULATION

FIELD OF THE INVENTION

The invention relates to variable speed wind turbine control methods and, in particular, to variable speed wind turbine control methods for improving the production of energy recovering energy losses.

BACKGROUND

Wind turbines are devices that convert mechanical energy to electrical energy. A typical wind turbine includes a nacelle mounted on a tower housing a drive train for transmitting the rotation of a rotor to an electric generator and is other components such as a yaw drive which orientates the wind turbine, several actuators and sensors and a brake. The rotor supports a number of blades extending radially therefrom for capturing the kinetic energy of the wind and causing the driving train rotational motion. The rotor blades have an aerodynamic shape such that when a wind blows across the surface of the blade, a lift force is generated causing the rotation of a shaft which is connected—directly or through a gearing arrangement—to the electrical generator located inside the nacelle. The amount of energy produced by wind turbines is dependent on the rotor blade sweeping surface that receives the action from the wind and consequently increasing the length of the blades leads normally to an increase of the power output of the wind turbine.

Under known control methods the power produced by a wind turbine increases with wind speed until a rated nominal power output is reached and then it is maintained constant. This is done regulating the pitching action of the blades so that the rotor blade's pitch angle is changed to a smaller angle of attack in order to reduce power capture and to a greater angle of attack to increase the power capture. Therefore the generator speed, and consequently, the power output may be maintained relatively constant with increasing wind velocities when this power output corresponds to the nominal power.

The power and rotor speed regulation implemented in most of the known commercial wind turbine control systems is based on controllers, such as a proportional controller (hereinafter referred to as P), a proportional-integral controller (hereinafter referred to as PI), a proportional-derivative controller (hereinafter referred to as PD), and a proportional-integral-derivative controller (hereinafter referred to as PID), that react to already produced errors between controlled variables and its set points with its associated limitations.

In case of gusts and turbulences wind speed may change drastically in a relatively small interval of time requiring relatively rapid changes of the pitch angle of the blades to maintain constant the power output that are difficult to implement taking into account the dynamics of the pitch control actuator, the inertia of the mechanical components and the wind spatial coherence. As a result, it is almost impossible to obtain the theoretically prescribed production in situations with a turbulent wind.

In order to solve this and other problems there are known several proposals of new control systems improving its performance with respect to known controllers such for instance the proposal disclosed in WO 2008/046942 A1.

This invention is addressed to the solution of said problem using known controllers so that it can be implemented in the already installed wind turbines.

SUMMARY OF THE INVENTION

It is an object of the present invention to provide wind turbines controlled by control methods that allow the optimization of the energy production.

It is another object of the present invention to provide wind turbines controlled by control methods that allow the optimization of the energy production in already installed wind turbines without the need of changing the underlying control technology.

It is another object of the present invention to provide wind turbine control methods adapted for optimizing the energy production associated to the partial production zone of the power curve (also called corner of the power curve).

In one aspect these and other objects are met by providing a method of operation of a variable speed wind turbine comprising control means for a standard regulation tracking a power vs. generator speed curve having a first sub-nominal zone where the generator speed is kept constant at its coupling value (related to the mechanical coupling of the drive train), a second sub-nominal zone where both generator speed and power are allowed to increase/decrease in line with wind speed, a third sub-nominal zone where the generator speed is kept constant at a nominal value and a nominal zone where the power is kept constant at a nominal value (hereinafter referred to as $P_n$), in which an alternative regulation at a higher power value (hereinafter referred to as $P_b$) than the power determined by said standard regulation for optimizing the energy production is used along determinate time periods (hereinafter referred to as $T_b$) for compensating energy losses (energy losses result in less production than the nominal energy). A sub-nominal zone is a zone lower than the nominal zone on a power vs. generator speed curve, the nominal zone being the zone where the power is kept constant at a nominal value $P_n$ as explained in the previous paragraph and the wind turbine electrical energy production is equal to the nominal power.

In a preferred embodiment said alternative regulation is based on a continuous calculation accomplished with the control of the wind turbine, of the accumulated lost energy (hereinafter referred to as ALE) as the energy lost with respect to the maximum allowed energy production according to the standard regulation, and is based on setting said higher power $P_b$ and the duration of said time periods $T_b$ to be compatible with wind turbine electrical or/and mechanical limitations. Hereby it is achieved a method for increasing the energy production of current installed wind turbines without any mechanical or electrical or underlying control technology modification of the wind turbine.

In another preferred embodiment said higher power $P_b$ is set as a constant. Hereby it is achieved a suitable method for wind turbines having limitations for power reference changes.

In another preferred embodiment said higher power $P_b$ is set as a variable dependant of the accumulated lost energy ALE. Hereby it is achieved a method allowing an optimization of the energy production.

In preferred embodiments suitable for currently installed wind turbines the higher power $P_b$ is comprised in a range of 104-110% the nominal power $P_n$ and the time periods $T_b$ comprised in a range of 180-300 s.

In another preferred embodiment the calculation of the accumulated lost energy ALE is performed by maintaining an upper limit (hereinafter referred to as $ALE_{max}$) and a lower limit (hereinafter referred to as $ALE_{min}$) so that accumulated lost energy (ALE) is maintained on recoverable levels using said alternative regulation. Hereby it is achieved a method which allows a controlled use of said alternative regulation.

In another preferred embodiment the upper limit $ALE_{max}$ is determined as the maximum energy recoverable in a time period $T_b$. Hereby it is achieved a method with allows an optimized use of said alternative regulation.

In another preferred embodiment said alternative regulation is activated when the wind turbine is controlled under said standard regulation, the accumulated lost energy ALE is higher than a predetermined value (hereinafter referred as "$ALE_1$"), and it is deactivated when the accumulated lost energy ALE is less than a predetermined value (hereinafter referred as "$ALE_2$"). Hereby is achieved a method which allows that the alternative regulation be used in a controller manner avoiding very short cycles of activation/deactivation.

In another aspect the above-mentioned objects are met by providing a variable generator speed wind turbine controlled by the above-mentioned method. Hereby is achieved a way for improving the energy production of many already installed wind turbines.

Other features and advantages of the present invention will be understood from the following detailed description in relation with the enclosed drawings.

DETAILED DESCRIPTION OF PREFERRED EMBODIMENTS

Figure 1:
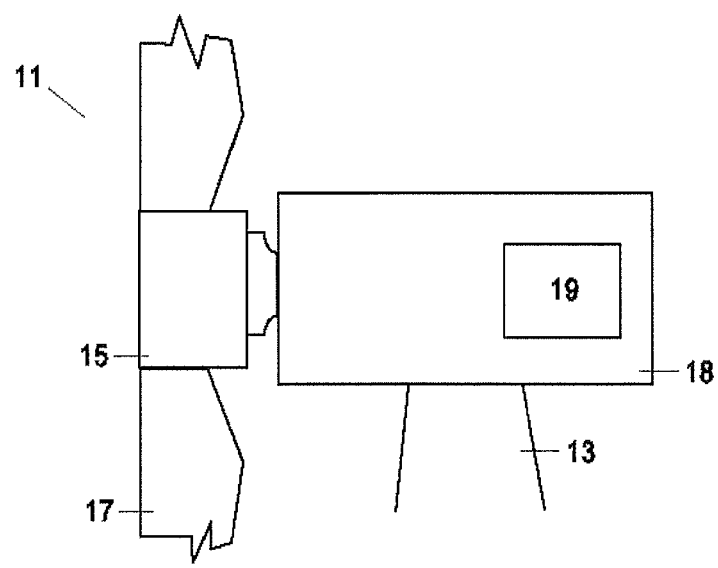
FIG. 1 shows schematically the main components of a wind turbine.

A typical wind turbine 11 comprises a tower 13 supporting a nacelle 18 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The power output from a modern wind turbine is typically controlled by means of a control system for regulating the pitch angle of the rotor blades and the generator torque. The rotor rotational speed and power output of the wind turbine can hereby be initially controlled e.g. before a transfer to a utility grid through a converter.

The basic aim of the methods of operation of variable speed wind turbines is to achieve an operation at the ideal aerodynamic output for as much time as possible.

As it is known, the kinetic energy associated with the incoming wind depends on the area swept by the rotor blades, on the air density and on the cube of the wind speed and it is considered that wind turbines can extract up to 59% of this energy. Accordingly, the capacity of each wind turbine to approach this limit is represented by the so-called power coefficient Cp which is determined by its aerodynamic characteristics, particularly by its tip-speed ratio $\lambda$, which is defined as the relationship between the tangential speed of the blade tip and the speed of the incident wind. If this ratio is kept at its optimal value, so that the rotor speed follows the wind speed, the maximum power coefficient Cp of the wind turbine is obtained, achieving an extremely efficient energy conversion.

The control strategy generally used in variable speed wind turbines is based on electrically adjusting the generator's torque to achieve the maximum output and this is carried out using a controller which receives signals indicating the generator speed and the power produced by the generator and which provides a torque reference signal to the converter to obtain the required power.

Accordingly, the wind turbine controller uses a curve which defines the desired functional relationship between power and generator rotor speed to achieve ideal output.

Figure 2:
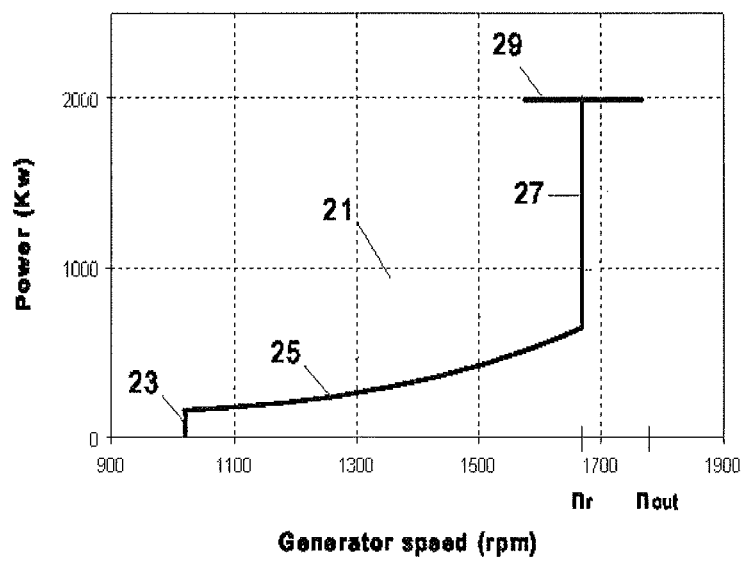
FIG. 2 shows a prior art Power vs. Generator speed curve used for controlling a variable speed wind turbine.

For a better understanding of the present invention a brief description of a typical prior art power vs. generator speed curve 21, shown in FIG. 2, follows.

This curve comprises a first sub-nominal zone 23 where the wind speed attains the minimum level for starting the wind turbine operation. In this zone, the wind turbine control is limited since the wind turbine can not capture the maximum energy. The second sub-nominal zone 25 corresponds to wind speeds in the range 4-8 m/s, where generator speed increases and the turbine is running with optimum power coefficient (Cp). The third sub-nominal zone 27 corresponds to wind speeds in the range 8-11 m/s where the generator speed is kept constant at the nominal generator speed ($n_r$) while power increases up to the nominal power. Within this zone the pitch angle is fixed and generator speed is controlled via torque. At the nominal zone 29 the full load wind turbine operation at nominal power takes place under pitch control to avoid overloads where the generator speed outage ($n_{out}$) occurs. The generator speed outage is the speed where the generator stops to work to avoid overloads in the machine.

Figure 3:
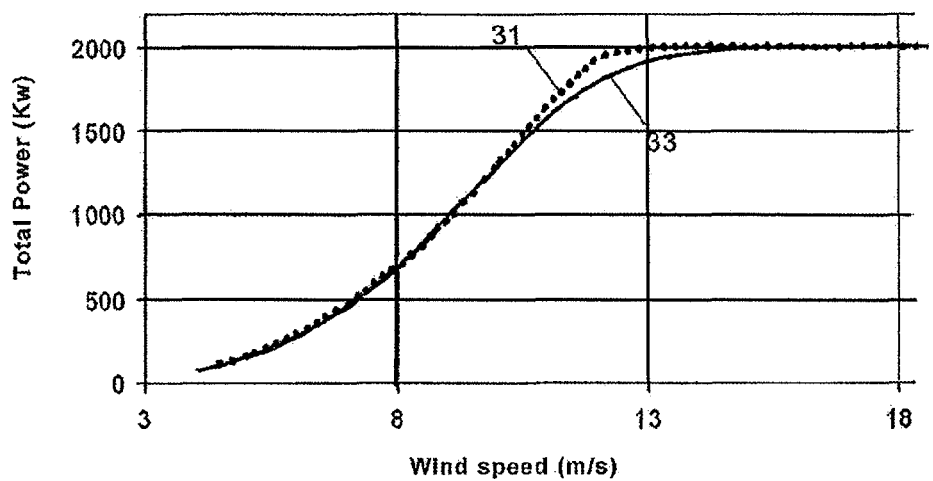
FIG. 3 shows an estimated averaged turbulent Power curve applying a prior art control method and an ideal steady Power curve.

In ideal conditions, the resulting average power curve will be curve 31 in FIG. 3 but as a consequence of, among other factors, the perturbations created by the wind turbulence and the above-mentioned features of the controllers the real power curve 33 suffers from a smothering in the corner zone close to the nominal power. This effect produces an energy loss with respect to the ideal energy output.

Figure 4:
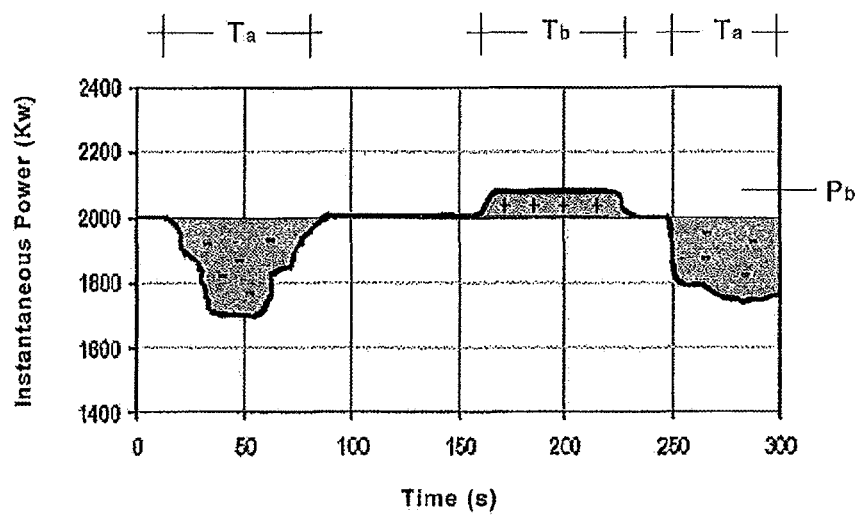
FIG. 4 shows a graph Instantaneous power vs. Time illustrating a method according to this invention having time periods with energy losses and time periods with energy gains.
Figure 5:
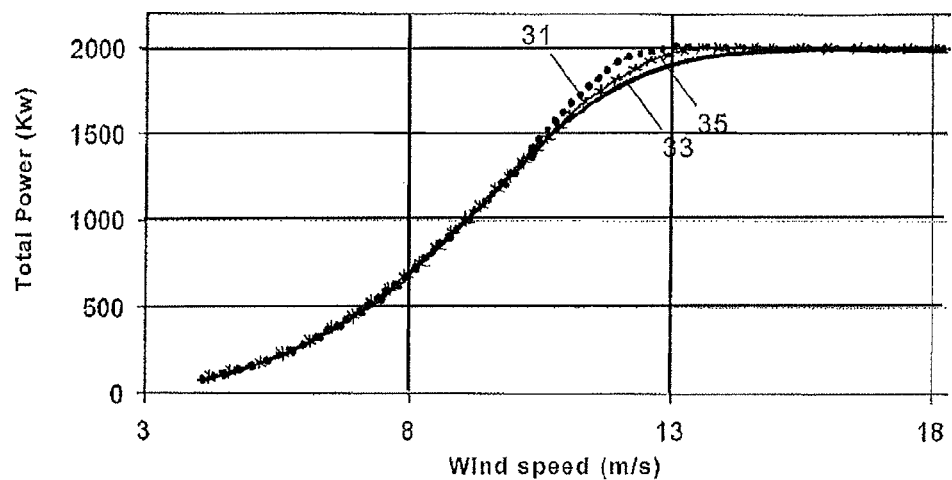
FIG. 5 shows an estimated averaged turbulent Power curve applying a prior art control method, an estimated averaged turbulent Power curve applying a control method according to the present invention and an ideal Power curve.

The basic idea of this invention, as illustrated in FIG. 4, is using an alternative regulation to the standard regulation along determinate time periods $T_b$ at a higher power $P_b$ than the nominal power $P_n$ for compensating previous energy losses at periods $T_a$. Doing so it can be achieved, as shown in FIG. 5, a resulting average power curve 35 closer to the ideal power curve 31 than the curve 33 corresponding to prior art control methods.

Said time periods $T_b$ are restricted by electrical and mechanical limits and consequently a full recovery of previous energy losses is very difficult. $T_b$ is comprised between 180-300 seconds for many of the known commercial wind turbines.

The higher power $P_b$ is highly related to both the mechanical and electrical limits of the wind turbine and it is considered that it is comprised in a range of 104-110% $P_n$ for many of the known commercial wind turbines On one side, the implementation of said alternative regulation is based on a continuous calculation of the accumulated lost energy ALE as the integration in time of the difference between the maximum allowed average power (the nominal power $P_n$) minus the power produced at each time interval, maintaining an upper limit $ALE_{max}$ for the maximum loss of energy to be allowed to accumulate that is established as the maximum amount of energy that it is considered as recoverable in hypothetical time periods $T_b$ at a higher power $P_b$, being the duration of the time periods $T_b$ and the level of said higher power $P_b$ compatible with the wind turbine electrical and mechanical limits and a lower limit $ALE_{min}$ for the minimum loss of energy to be allowed to accumulate.

$ALE_{max}$ can be obtained in general as the integration of $P_b-P_n$ from t=0 to $T_b$. The parameter $ALE_{min}$ is defined so that it can be provided a small extra margin for energy recovery, mainly in the instants in which during the standard regulation the power is slightly above the control reference.

The alternative regulation is activated when the wind turbine is controlled under the standard regulation and the accumulated lost energy ALE is higher than a predetermined value $ALE_1$. The alternative regulation is deactivated when the accumulated lost energy ALE is less than a predetermined value $ALE_2$.

On the other hand, the implementation of said alternative regulation is based on the determination of the higher power $P_b$ to be used, i.e. increment of power to be added to the maximum allowed power inside the torque loop, with the aim of recovering the energy deficit of former periods.

In one embodiment $P_b$ can be set as a constant for the alternative regulation.

In another embodiment $P_b$ is calculated taking into account the amount of accumulated lost energy ALE to be recovered and the duration limitations for a time period $T_b$ under the alternative regulation. In particular, $P_b$ can be calculated using a pre-defined table of the relationship between ALE and $P_b$ taking into account those wind turbine mechanical and electrical features that are relevant for the alternative regulation. In any case $P_b$ can reach a pre-defined maximum power $P_{max}$. The relationship between ALE and $P_b$ is a relationship between their individual quantities.

The values of the above mentioned parameters $ALE_1$, $ALE_2$, $ALE_{max}$, $ALE_{min}$ are also determined taking into account generator and converter limitations regarding among other features to power factor, temperature and voltage. Overcurrent and thermal restrictions shall be particularly taken into account.

Figure 6:
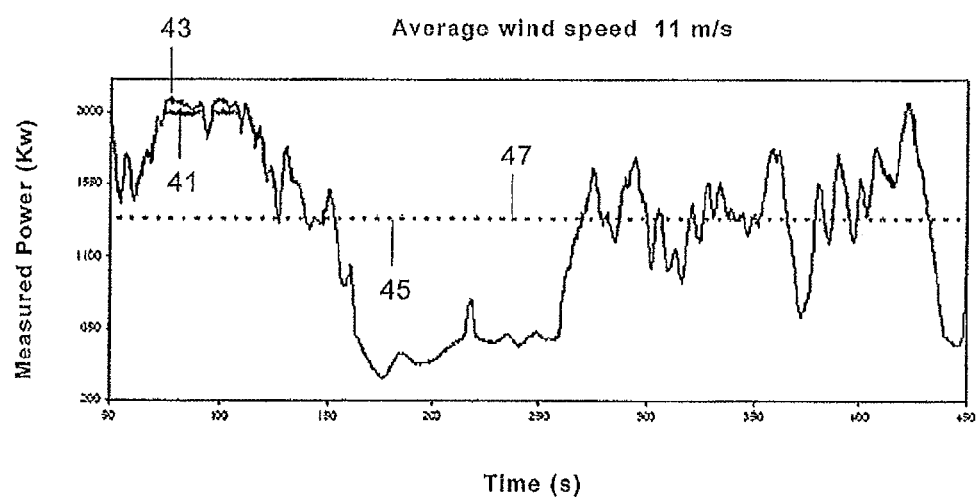
FIG. 6 shows Measured power vs. Time and averaged Power vs. Time curves resulting in a simulation applying a prior art control method and a control method according to the present invention for an averaged wind speed of 11 m/s.
Figure 7:
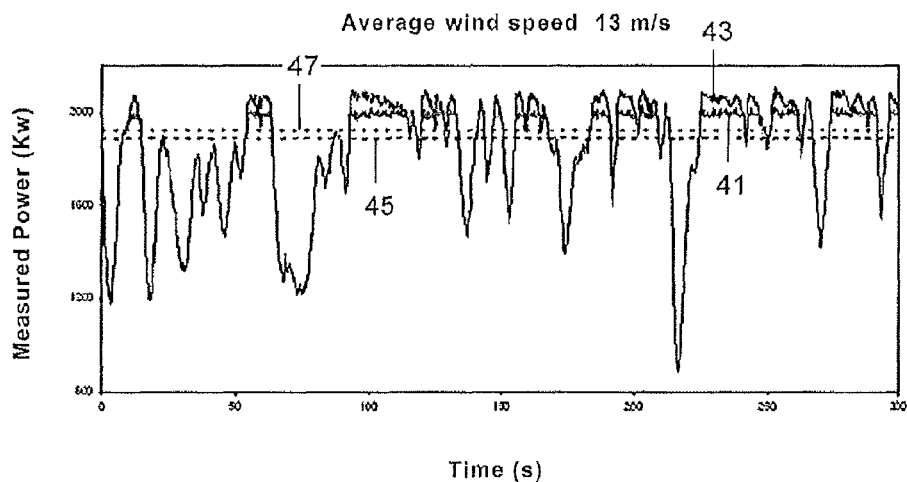
FIG. 7 shows Measured power vs. Time and averaged Power vs. Time curves resulting in a simulation applying a prior art control method and a control method according to the present invention for an averaged wind speed of 13 m/s.
Figure 8:
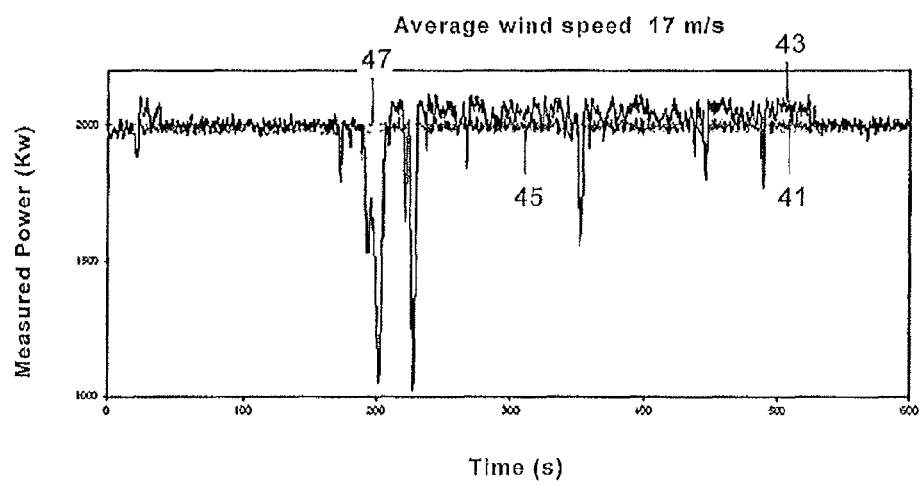
FIG. 8 shows Measured power vs. Time and averaged Power vs. Time curves resulting in a simulation applying a prior art control method and a control method according to the present invention for an averaged wind speed of 17 m/s.

FIGS. 6-8 show the power curves 41 obtained in simulations applying the prior art regulation and the power curves 43 applying the regulation according to this invention, for average wind speeds of, respectively, 11 m/s, 15 m/s and 17 m/s. The averaged power curves 45, 47 applying both regulations are also shown.

As it can be seen in FIGS. 6-8 applying a control method according to the present invention there are time periods where the standard regulation is used in which there are energy losses, followed by time periods where the alternative regulation according to this invention is used for recovering, al least in part, said energy losses. The recovery amount is higher when the wind speed demands an operational power close to the nominal power.

The above-mentioned FIGS. 6-8 have been obtained applying a control method according to the present invention to a 2 MW wind turbine with 80 m of diameter. It has been considered a nominal power $P_n$ of 2000 kW, a higher power $P_b$ of 2080 kW, a time period $T_b$ of 180 s, an $ALE_{max}$ of 14400 kWs {calculated as the area $(P_b-P_n)\times T_b$, i.e $(2080-2000)\times 180$}, an $ALE_{min}$ of −600 kWs (the 2% of nominal power in a period of 15 s), an $ALE_2$ of 0 kWs and an $ALE_1$ of 576 kWs (4% of $ALE_{max}$).

The method considered in this invention is implemented using the means available in the control systems of variable speed wind turbines. These means comprise on the one hand devices for measurement of relevant variables such as generator speed or power produced at each instant and processing means which allow to set up operational references for the wind turbine such as the torque demanded by the generator as a function of conditions.

The alternative regulation subject of this invention is implemented in particular by including in the above-mentioned processing means an algorithm whose basic input data is, as we have indicated, the power produced P and whose basic output data are the activation of the alternative regulation under an operational reference for the torque demanded by the generator and the deactivation of said alternative regulation.

Finally it shall be noted that an advantage of the alternative regulation subject of in this invention compared with the known art is that allows a compensation of energy losses with respect to the ideal prescribed production due to any reason.

Although this invention has been described entirely in terms of preferred embodiments, it is clear that we could introduce modifications within its scope, not regarding the latter as a limited by the embodiments described above, rather by the content of the following claims.

The invention claimed is:

1. A control system for controlling a variable speed wind turbine to improve electrical energy production of said variable speed wind turbine,
   said variable speed wind turbine comprising an electrical generator having a generator speed and outputting an electrical power;
   said control system having a processor that uses a standard regulation that tracks an electrical power versus generator speed curve wherein the electrical power versus generator speed curve has a first sub-nominal zone where the generator speed is kept constant at a coupling value related to mechanical coupling of a drive train of the wind turbine, a second sub-nominal zone where both the generator speed and the electrical power are allowed to increase or decrease with wind speed, a third sub-nominal zone where the generator speed is kept constant at a nominal speed value, and a nominal zone where the electrical power is kept constant at a nominal power value ($P_n$); wherein said processor further uses:
   an alternative regulation at an electrical power ($P_b$) higher than the nominal power ($P_n$) of said standard regulation, said alternative regulation being used along determinate time periods ($T_b$);
   wherein an accumulated lost energy (ALE) is calculated, said accumulated lost energy (ALE) is an integral over a time interval ($T_a$) of a difference between the nominal power ($P_n$) and a power produced by the variable speed wind turbine during the time interval ($T_a$), the calculation of the accumulated lost energy (ALE) is performed by the processor of the control system of the variable speed wind turbine;

wherein the higher electrical power ($P_b$) and the determinate time periods ($T_b$) are compatible with electrical and mechanical limitations of the variable speed wind turbine, said alternative regulation is activated when the accumulated lost energy (ALE) is higher than a first predetermined value ($ALE_1$), and said alternative regulation is deactivated when the accumulated lost energy (ALE) is less than a second predetermined value ($ALE_2$).

2. The control system according to claim 1, wherein said higher electrical power ($P_b$) is a constant.

3. The control system according to claim 1, wherein said higher electrical power ($P_b$) is a variable dependant of the accumulated lost energy (ALE).

4. The control system according to claim 1, wherein said higher electrical power ($P_b$) is in a range of 104-110% of the nominal electrical power ($P_n$).

5. The control system according to claim 1, wherein a duration of said time periods ($T_b$) is in a range of 180-300 seconds.

6. The control system according to claim 1, wherein an upper limit ($ALE_{max}$) of the accumulated lost energy is calculated as an integral of the higher electrical power ($P_b$) minus the nominal power ($P_n$) during the time periods ($T_b$), wherein the upper limit ($ALE_{max}$) is calculated by the processor of the control system of the variable speed wind turbine, and a lower limit ($ALE_{min}$) of the accumulated lost energy is set, wherein the upper limit ($ALE_{max}$) is a maximum loss of electrical energy that is allowed to accumulate before the alternative regulation is activated and the lower limit ($ALE_{min}$) is a minimum loss of electrical energy that is allowed to accumulate before the alternative regulation is activated.

7. The control system according to claim 6, wherein the upper limit ($ALE_{max}$) is a maximum amount of electrical energy that is recoverable in a time period ($T_b$).

8. The control system according to claim 1, wherein said alternative regulation is activated in said third sub-nominal zone or in said nominal zone.

9. A variable speed wind turbine controlled by a control system as claimed in claim 1.

10. A control method for controlling a variable speed wind turbine to improve electrical energy production of said variable speed wind turbine, said variable speed wind turbine comprising an electrical generator having a generator speed and outputting an electrical power, said control method comprising:

in a standard regulation, tracking an electrical power versus generator speed curve, wherein the electrical power versus generator speed curve has a first sub-nominal zone where the generator speed is kept constant at a coupling value related to mechanical coupling of a drive train of the wind turbine, a second sub-nominal zone where both the generator speed and the electrical power are allowed to increase or decrease with wind speed, a third sub-nominal zone where the generator speed is kept constant at a nominal speed value, and a nominal zone where the electrical power is kept constant at a nominal power value ($P_n$);

applying an alternative regulation along determinate time periods ($T_b$), wherein said alternative regulation is at an electrical power ($P_b$) higher than the nominal power ($P_n$) of said standard regulation;

calculating an accumulated lost energy (ALE), wherein said accumulated lost energy (ALE) is an integral over a time interval ($T_a$) of a difference between the nominal power ($P_n$) and a power produced by the variable speed wind turbine during the time interval ($T_a$);

setting the higher electrical power ($P_b$) and the determinate time periods ($T_b$) to be compatible with electrical and mechanical limitations of the variable speed wind turbine;

activating said alternative regulation when the accumulated lost energy (ALE) is higher than a first predetermined value ($ALE_1$); and deactivating said alternative regulation when the accumulated lost energy (ALE) is less than a second predetermined value ($ALE_2$).

11. The control method according to claim 10, further comprising setting said higher electrical power ($P_b$) as a constant.

12. The control method according to claim 10, further comprising setting said higher electrical power ($P_b$) as a variable dependent of the accumulated lost energy (ALE).

13. The control method according to claim 10, wherein said higher electrical power ($P_b$) is comprised in a range of 104-110% of the nominal electrical power ($P_n$).

14. The control method according to claim 10, wherein a duration of said time periods ($T_b$) is comprised in a range of 180-300 seconds.

15. The control method according to claim 10, further comprising:

calculating an upper limit ($ALE_{max}$) of the accumulated lost energy as an integral of the higher electrical power ($P_b$) minus the nominal power ($P_n$) during the time periods ($T_b$);

setting a lower limit ($ALE_{min}$) of the accumulated lost energy;

wherein the upper limit ($ALE_{max}$) is a maximum loss of electrical energy that is allowed to accumulate before the alternative regulation is activated and the lower limit ($ALE_{min}$) is a minimum loss of electrical energy that is allowed to accumulate before the alternative regulation is activated.

16. The control method according to claim 15, wherein the upper limit ($ALE_{max}$) is the maximum amount of electrical energy that is recoverable in a time period ($T_b$).

17. The control method according to claim 10, further comprising activating said alternative regulation in said third sub-nominal zone or in said nominal zone.

* * * * *